(12) United States Patent
Atakan (10) Patent No.: US 10,752,545 B2
(45) Date of Patent: Aug. 25, 2020

(54) STEAM-ASSISTED PRODUCTION OF METAL SILICATE CEMENTS, COMPOSITIONS AND METHODS THEREOF

(71) Applicant: Solidia Technologies, Inc., Piscataway, NJ (US)

(72) Inventor: Vahit Atakan, West Windsor, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 224 days.

(21) Appl. No.: 15/335,520

(22) Filed: Oct. 27, 2016

(65) Prior Publication Data
US 2017/0121223 A1    May 4, 2017

Related U.S. Application Data

(60) Provisional application No. 62/247,590, filed on Oct. 28, 2015.

(51) Int. Cl.

| | | |
|---|---|---|
| C04B 7/00 | (2006.01) | |
| C04B 7/43 | (2006.01) | |
| C04B 7/44 | (2006.01) | |
| C04B 7/345 | (2006.01) | |
| C04B 28/18 | (2006.01) | |
| C04B 12/04 | (2006.01) | |
| C04B 7/34 | (2006.01) | |
| C04B 28/00 | (2006.01) | |
| C04B 32/00 | (2006.01) | |
| C04B 14/40 | (2006.01) | |

(52) U.S. Cl.
CPC ............... *C04B 7/43* (2013.01); *C04B 7/345* (2013.01); *C04B 7/44* (2013.01); *C04B 7/4476* (2013.01); *C04B 12/04* (2013.01); *C04B 28/188* (2013.01); *Y02P 40/121* (2015.11)

(58) Field of Classification Search
USPC .................................. 106/638, 704, 723, 737
See application file for complete search history.

(56) References Cited

U.S. PATENT DOCUMENTS

| | | | | |
|---|---|---|---|---|
| 2,215,891 | A * | 9/1940 | Thomson ................ | C01B 33/22 106/796 |
| 3,498,802 | A * | 3/1970 | Stookey .................. | C04B 28/26 501/54 |
| 3,663,249 | A * | 5/1972 | Rao ........................ | C03C 11/007 106/604 |
| 3,717,488 | A * | 2/1973 | Magnan .................. | C04B 28/18 106/723 |
| 4,238,240 | A * | 12/1980 | Krijgsman ................ | B01J 3/02 106/712 |
| 4,334,931 | A * | 6/1982 | Asaumi .................. | C04B 28/188 106/712 |
| 6,334,885 | B1 * | 1/2002 | Fukushima ............. | C04B 7/153 106/705 |
| 8,257,486 | B2 * | 9/2012 | Nayak ................... | C04B 28/021 106/287.1 |
| 2002/0112648 | A1 * | 8/2002 | Krowl ..................... | C04B 28/18 106/672 |
| 2008/0099122 | A1 * | 5/2008 | Andersen ................ | C04B 28/04 156/60 |
| 2014/0093441 | A1 * | 4/2014 | Jones ..................... | B01D 53/62 423/230 |
| 2014/0234946 | A1 * | 8/2014 | Constantz .............. | B01D 53/78 435/266 |
| 2016/0075598 | A1 | 3/2016 | Schmitt et al. | |

FOREIGN PATENT DOCUMENTS

| | | |
|---|---|---|
| EP | 2243754 A1 | 10/2010 |
| EP | 2801557 A1 | 11/2014 |
| GB | 2013648 A | 8/1979 |
| JP | 2009-155134 A | 7/2009 |

\* cited by examiner

*Primary Examiner* — James E McDonough
(74) *Attorney, Agent, or Firm* — Dentons US LLP (57) ABSTRACT

The invention provides a novel, steam-assisted production methodology and associated compositions and methods of use in the manufacture of carbonatable or non-carbonatable metal silicate or metal silicate hydrate (e.g., calcium silicate or calcium silicate hydrate) compositions. These metal silicate compositions and related phases are suitable for use hydraulic, partially hydraulic or non-hydraulic cement that sets and hardens by a hydration process, a carbonation process or a combination thereof, and may be applied in a variety of concrete components in the infrastructure, construction, pavement and landscaping industries.

14 Claims, 8 Drawing Sheets

FIG. 1

PRIOR ART

FIG. 2

PRIOR ART

FIG. 3

PRIOR ART

FIG. 4

PRIOR ART

FIG. 5

PRIOR ART

FIG. 6

PRIOR ART

FIG. 7

PRIOR ART

FIG. 8

PRIOR ART

STEAM-ASSISTED PRODUCTION OF METAL SILICATE CEMENTS, COMPOSITIONS AND METHODS THEREOF

PRIORITY CLAIMS AND RELATED PATENT APPLICATIONS

This application claims the benefit of priority from U.S. Provisional Application Ser. No. 62/247,590, filed on Oct. 28, 2015, the entire content of which is incorporated herein by reference in its entirety.

FIELD OF THE INVENTION

The invention generally relates to cement technologies and metal silicate compositions. More particularly, the invention relates to a novel, steam-assisted production methodology in the manufacture of non-carbonatable or carbonatable metal silicate or metal silicate hydrate (e.g., calcium silicate or calcium silicate hydrate) materials, and the associated compositions and methods of use. These metal silicate compositions and related phases (collectively referred to as "cementitious metal silicate compositions") are suitable for use as hydraulic, partially hydraulic or non-hydraulic cement that sets and hardens by a hydration process, a carbonation process or a combination thereof, and may be applied in a variety of concrete components in the infrastructure, construction, pavement and landscaping industries.

BACKGROUND OF THE INVENTION

Concrete is the most consumed man-made material in the world. A typical concrete is made by mixing cement, water and aggregates such as sand and crushed stone. Cementitious materials have been synthesized from limestone and shale, which are the calcium and silica sources, respectively. The raw materials are ground either together or separately and then fired together to form calcium rich calcium silicates. This process requires very high temperatures such as 1500° C. Portland cement, for example, is made by burning a mixture of ground limestone and clay, or materials of similar composition in a rotary kiln at a sintering temperature of 1450° C. Portland cement manufacturing is thus highly energy-intensive and releases considerable quantities of greenhouse gas.

There is an ongoing need for improved cement production methods that significantly reduce the energy requirement, are more environmentally friendly, and give rise to improved product performance. For instance, improvements that allow production at lower temperatures and/or with a broader array of source materials are desirable.

SUMMARY OF THE INVENTION

The invention provides a novel, steam-assisted production methodology and relates to compositions of non-carbonatable or carbonatable metal silicate or metal silicate hydrate (e.g., calcium silicate or calcium silicate hydrate) compositions, and methods of their manufacture and use. The cementitious metal silicate compositions are suitable for use as hydraulic, partially hydraulic or non-hydraulic cement that hardens by a hydration process, a carbonation process, or a combination thereof.

In one aspect, the invention generally relates to a method for producing cement. The method includes: (a) providing a ground mixture comprising source materials of metal oxide (e.g., calcium oxide) and silica; (b) providing a gas comprising a steam of water over the ground mixture of source materials at a pressure, where in the partial pressure of the steam of water ranges from atmospheric pressure to a pressure of supercritical water; and (c) subjecting the ground mixture of source materials (i) to a temperature and for a time sufficient to calcine the ground mixture and (ii) to a temperature and for a time sufficient to fuse the calcined ground mixture to form the cement and/or cement agglomerate.

In another aspect, the invention generally relates to a cement material produced according to a method of cement production disclosed herein.

In yet another aspect, the invention generally relates to a powdery cement material produced according to a method of cement production disclosed herein.

In yet another aspect, the invention generally relates to a method for curing the cement material of the invention. The curing method includes: mixing the powdery cement material and one or more aggregates or fillers with water and allowing the mixture to set for a time and at a temperature sufficient to form a concrete product.

In yet another aspect, the invention generally relates to an article of manufacture produced by a curing method disclosure herein.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

The invention is based on a novel, steam-assisted production methodology and relates to compositions of non-carbonatable or carbonatable metal silicate or metal silicate hydrate (e.g., calcium silicate or calcium silicate hydrate) compositions, and methods of manufacture and use thereof.

In one aspect, the invention generally relates to a method for producing cement. The method includes: (a) providing a ground mixture comprising source materials of metal oxide (e.g., calcium oxide) and silica; (b) providing a gas comprising a steam of water over the ground mixture of source materials at a pressure, wherein the steam of water has a partial pressure that ranges from atmospheric pressure to a pressure of supercritical water; and (c) subjecting the ground mixture of source materials (i) to a temperature and for a time sufficient to calcine the ground mixture and (ii) to a temperature and for a time sufficient to fuse the calcined ground mixture to form the cement and/or cement agglomerate.

Any suitable steam source may be used to provide a water steam over the ground mixture of source materials. The pressure of the production chamber may have a pressure from atmospheric pressure to that of supercritical water. Without wishing to be bound by the theory, it is believed that steam acts as a reaction enhancer allowing lowed reaction temperature. In certain preferred embodiments, the temperature sufficient to calcine the ground mixture is lower than about 1,200° C., for example, from 400° C. to 800° C. (e.g., about 500° C., 600° C., 700° C., 800° C.). In certain preferred embodiments, the temperature sufficient to fuse the calcined ground mixture is lower than about 1,200° C., for example, from 400° C. to 800° C. (e.g., about 500° C., 600° C., 700° C., 800° C.). It is noted that the temperature may be controlled as a function of time, for example, in the form of a loop to start from ambient temperature to a temperature of about 500° C. to 600° C. and to end at ambient temperature upon cooling. It is also noted that the pressure control may be in the form of a loop as well, in particular correlation with the temperature control.

In certain preferred embodiments, the steam of water is substantially in supercritical condition.

In certain preferred embodiments, the method further includes a step of cooling the cement to ambient temperature. In certain preferred embodiments, the method further includes a step of grinding the cement agglomerates to form powdery cement. In certain preferred embodiments, the method further includes, before grinding, a step of adding one or more set-controlling admixtures to the mixture.

The cementitious metal silicate compositions can be made from widely available, low cost raw materials by a process suitable for large-scale production. Any suitable sources of metal oxide and silica may be used. In certain preferred embodiments, the source materials of metal oxide and silica are selected from magnesium silicates, magnesium oxide and silica source, calcium oxide and silica source, magnesium carbonate and silica source, calcium carbonate and silica source, low-grade limestone and silica, magnesium calcium aluminates, magnesium calcium aluminum silicates, and magnesium calcium silicates. Thus, while the metal silicate used herein is primarily referring to calcium silicate, other metal silicates such as magnesium calcium aluminates, magnesium calcium aluminum silicates, and magnesium calcium silicates may constitute significant percentages of the materials.

The production method of the invention is flexible in equipment and production requirements and is readily adaptable to manufacturing facilities of conventional cement. The unique approach offers substantially reduced production temperature and energy consumption.

For example, cementitious metal silicate compositions can be produced in commercial cement rotary kilns using the raw materials used for Ordinary Portland Cement (OPC) clinker. An important feature of the cementitious metal silicate compositions is that they be suitable for hardening by a hydration process (i.e., in combination with water), a carbonation process (i.e., in combination with $CO_2$ and non-reactive water) or a combination thereof (i.e., in combination with $CO_2$ and reactive water).

In another aspect, the invention generally relates to a cement material produced according to a method of cement production disclosed herein.

In yet another aspect, the invention generally relates to a powdery cement material produced according to a method of cement production disclosed herein.

In yet another aspect, the invention generally relates to a method for curing the cement material of the invention. The curing method includes: mixing the powdery cement material and one or more aggregates or fillers with water and allowing the mixture to set for a time and at a temperature sufficient to form a concrete product.

In certain embodiments, the curing process is performed in a $CO_2$-rich atmosphere, for example, under a $CO_2$ concentration ranging from about 25% to about 99.5% (e.g., from about 50% to about 99.5%, from about 70% to about 99.5%, from about 80% to about 99.5%, from about 90% to about 99.5%).

The cementitious metal silicate compositions of the invention are suitable for use as hydraulic, partially hydraulic or non-hydraulic cement that hardens by a hydration process, a carbonation process, or a combination thereof. The cementitious metal silicate compositions of the invention may be applied in a variety of concrete components in the infrastructure, construction, pavement and landscaping industries.

In yet another aspect, the invention generally relates to an article of manufacture produced by a curing method disclosure herein.

Various parameters of production such as material sources, temperatures, pressures, reaction times, admixtures, etc., may be selected to achieve desired cement properties.

Figure 1:
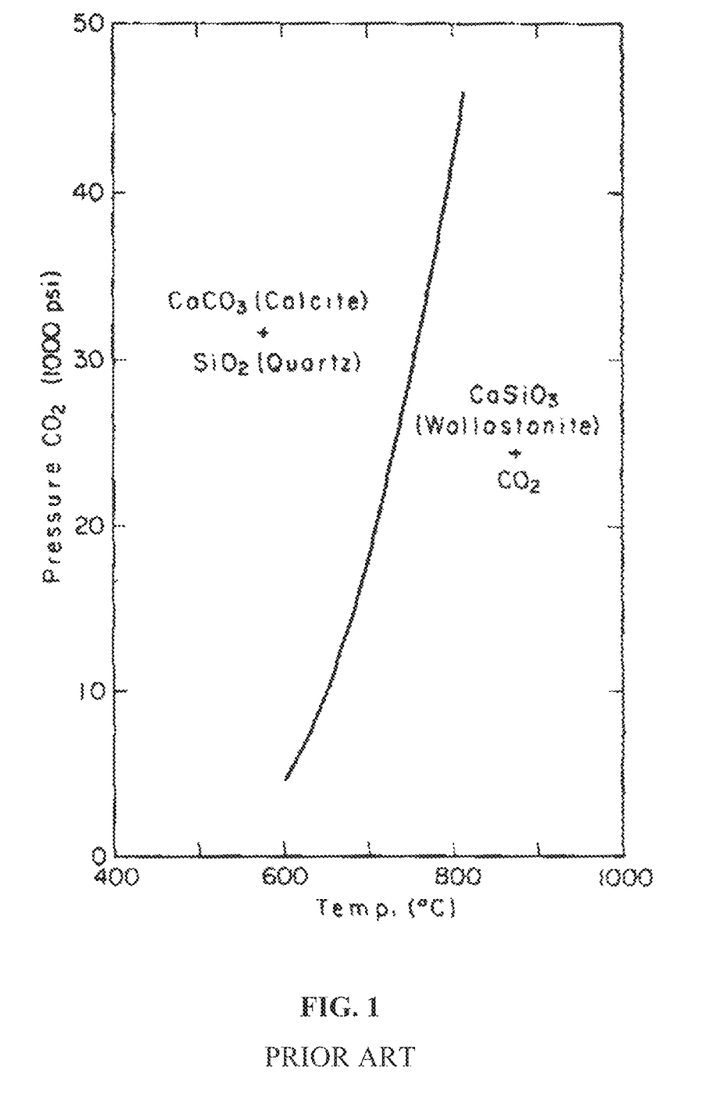
FIG. 1 is a pressure-temperature phase diagram showing the phases present in the reversible reaction $CaCO_3 + SiO_2 \leftrightarrow CaSiO_3$ (calcium silicate)$+CO_2$.

FIG. 1 is a pressure-temperature phase diagram showing the phases present in the reversible reaction $CaCO_3 + SiO_2 \leftrightarrow CaSiO_3$ (calcium silicate)$+CO_2$.

Figure 2:
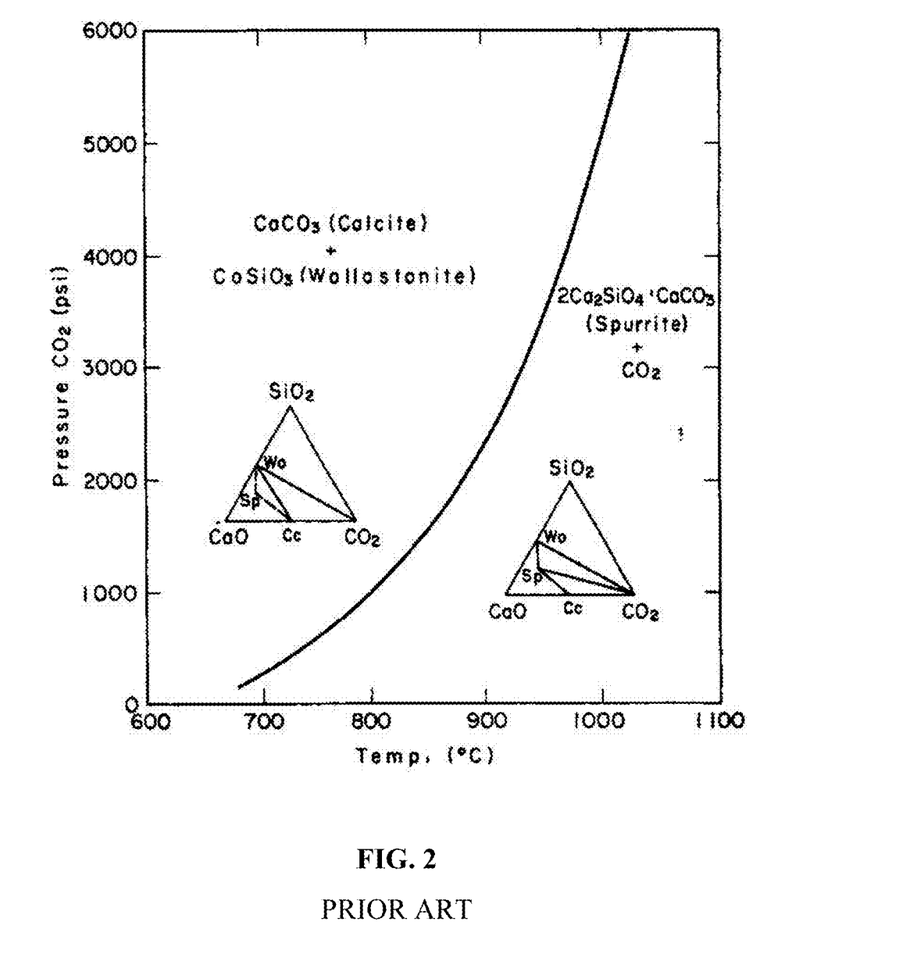
FIG. 2 is a pressure-temperature phase diagram showing the phases present in the reversible reaction $3CaCO_3 + 2CaSiO_3 \leftrightarrow 2Ca_2SiO_4.CaCO_3 + CO_2$.

FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.

Figure 3:
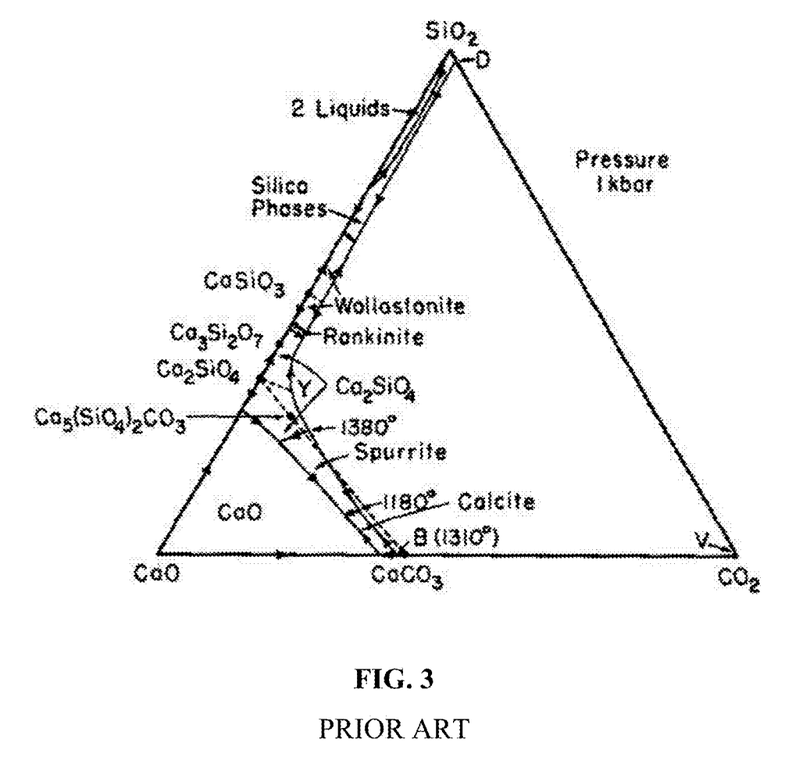
FIG. 3 is a phase diagram of the $CaO$—$SiO_2$—$CO_2$ system at a pressure of 1 kilobar.

FIG. 3 is a phase diagram of the $CaO-SiO_2-CO_2$ system at a pressure of 1 kilobar.

Figure 4:
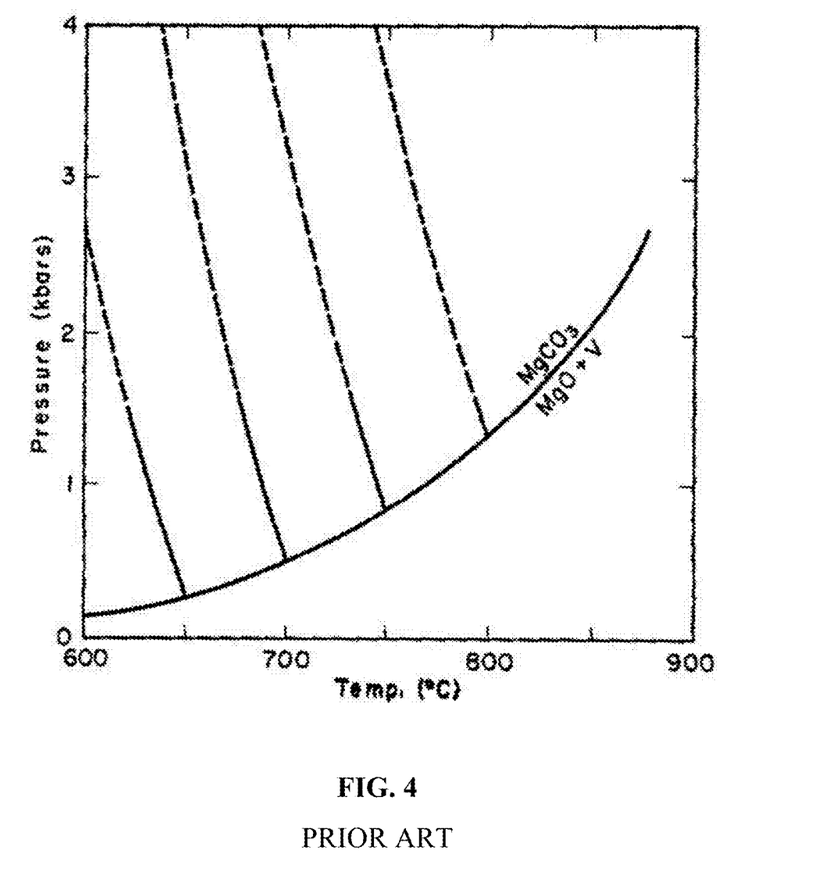
FIG. 4 is a pressure-temperature phase diagram showing the phases present in the reversible reaction $MgO + CO_2 \leftrightarrow MgCO_3$.

FIG. 4 is a pressure-temperature phase diagram showing the phases present in the reversible reaction $MgO + CO_2 \leftrightarrow MgCO_3$.

Figure 5:
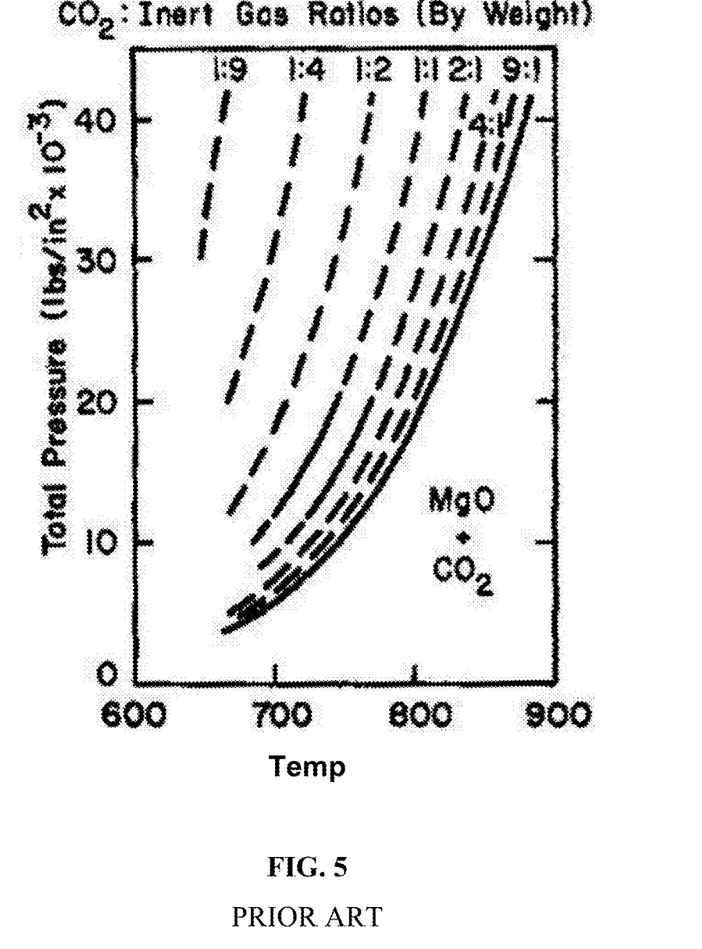
FIG. 5 is a pressure-temperature phase diagram showing the equilibrium curves for the reversible reaction $MgO + CO_2 \leftrightarrow MgCO_3$ as a function of the proportion of $CO_2$ in an inert gas.

FIG. 5 is a pressure-temperature phase diagram showing the equilibrium curves for the reversible reaction $MgO + CO_2 \leftrightarrow MgCO_3$ as a function of the proportion of $CO_2$ in an inert gas.

Figure 6:
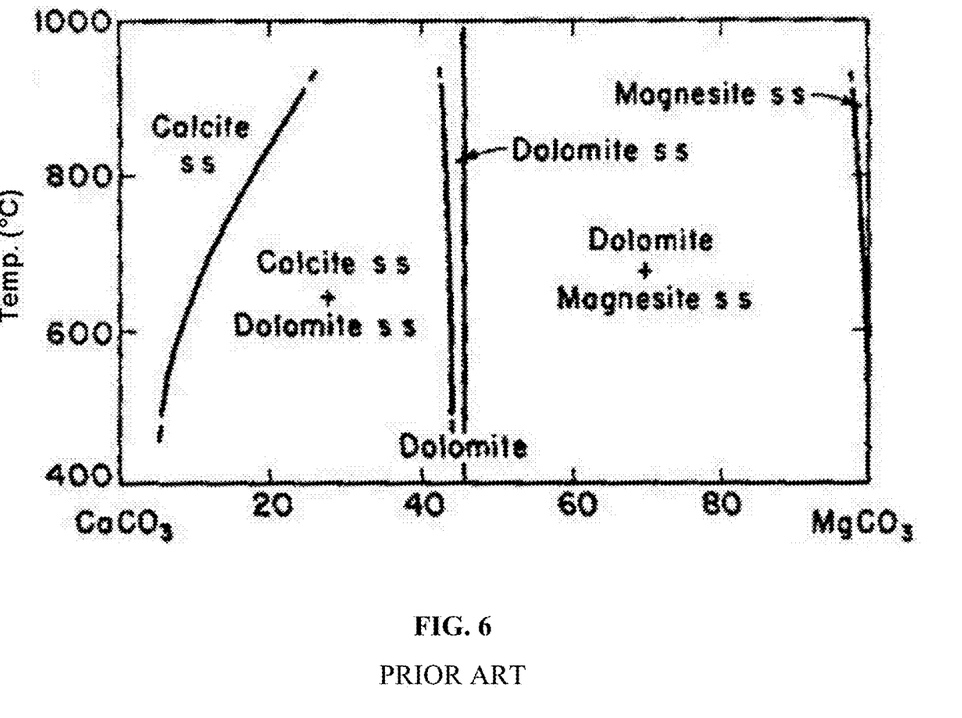
FIG. 6 is a temperature-composition phase diagram that illustrates the stability regions for various phases in the $CaCO_3$—$MgCO_3$ system.

FIG. 6 is a temperature-composition phase diagram that illustrates the stability regions for various phases in the $CaCO_3-MgCO_3$ system.

Figure 7:
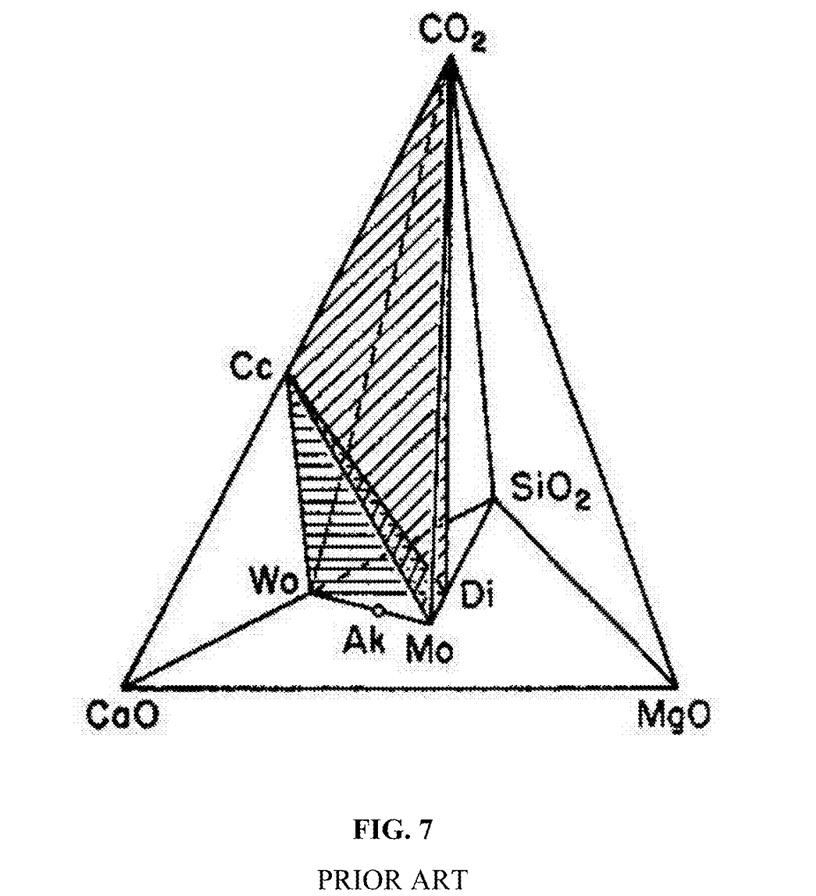
FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).

FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).

Figure 8:
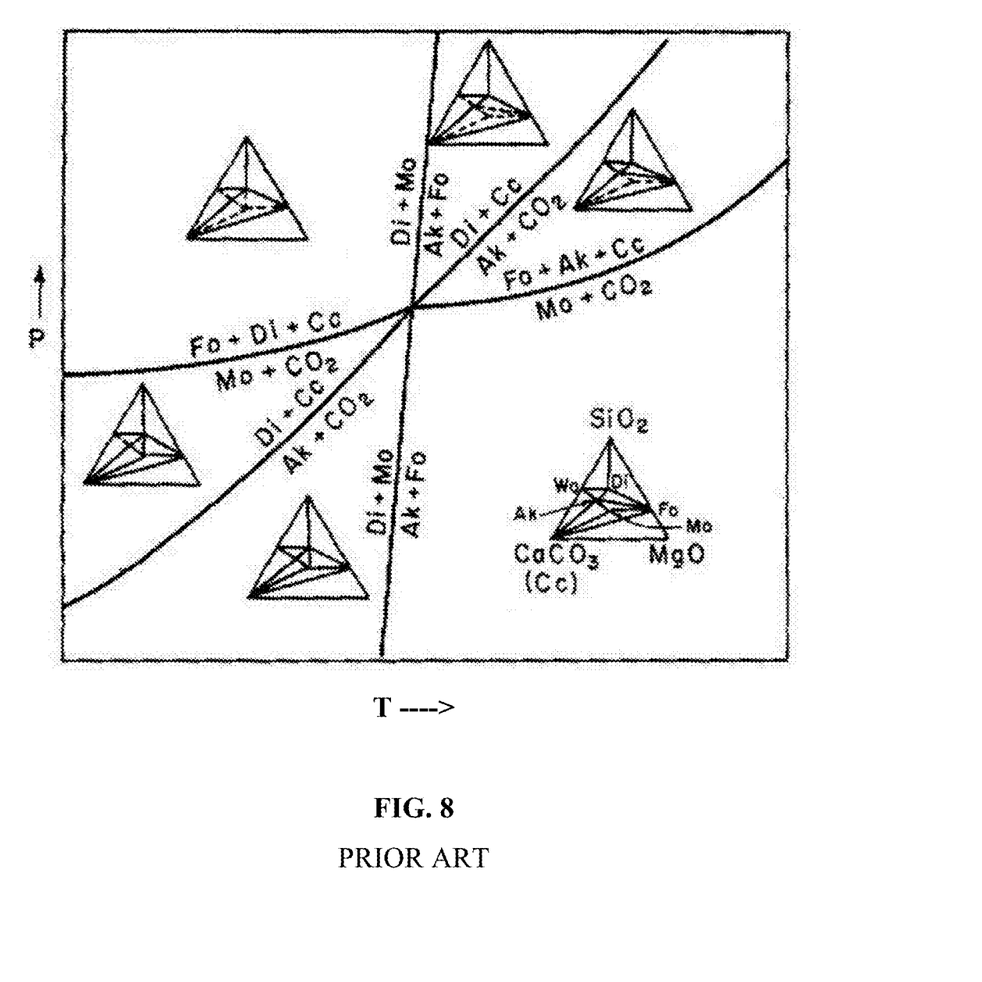
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

The cement material of the invention may be produced under conditions that result in primarily noncarbonatable hydraulic calcium silicate materials. The cement material of the invention may be also produced under conditions that result in partially carbonatable and partially hydraulic calcium silicate materials. The cement material of the invention may further be produced under conditions resulting in primarily carbonatable non-hydraulic calcium silicate materials.

Hydrating phases include $Ca_3SiO_5$ (C3S), $Ca_2SiO_4$ (C2S), $Ca_3Al_2O_6$ (C3A), $Ca_4Al_2Fe_2O_{10}$ (C4AF), $CaSO_4.2H_2O$ (C$\bar{S}$2H), $CaSO_4.0.5H_2O$ (C$\bar{S}$0.5H), $4CaO.3Al_2O_3.SO_3$ (C4A3$\bar{S}$), CaO (C), amorphous calcium silicate, amorphous calcium aluminum silcate, and amorphous mellilite groups. When reacted with water these hydrating phases form hydration products such as $Ca(OH)_2$ (portlandite), $Ca_6Al_2(SO_4)_3(OH)_{12}.26H_2O$ (ettringite) and calcium silicate hydrate (CSH) gel, hydrated amorphous mellilites.

Carbonatable (reactive) phases include CS (wollastonite or pseudowollastonite), C3S2 (rankinite) and (belite or larnite or bredigite). The C2S phase present within the calcium silicate composition may exist as $(Ca_7Mg(SiO_4)_4)$ (bredigite) or as any of $\alpha$-$Ca_2SiO_4$, $\beta$-$Ca_2SiO_4$ or $\gamma$-$Ca_2SiO_4$ polymorph or combination thereof. The carbonatable calcium silicate cement may additionally have a reactive amorphous phase of varying composition. The carbonatable calcium silicate compositions may also include small quantities of residual CaO (lime) and $SiO_2$ (silica) from raw materials after sintering. The calcium silicate composition may also include small quantities of C3S (alite, $Ca_3SiO_5$). The carbonatable calcium silicate compositions may additionally include quantities of inert phases (i.e., non-carbonatable under typical carbonation conditions) such as melilite type minerals (melilite or gehlenite or akermanite) with the general formula $(Ca,Na,K)_2[(Mg, Fe^{2+},Fe^{3+},Al,Si)_3O_7]$ and ferrite type minerals (ferrite or brownmillerite or C4AF) with the general formula $Ca_2(Al,Fe^{3+})_2O_5$.

Discussions of various features of a controlled Hydrothermal Liquid Phase Sintering (HLPS)-based carbonation can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. Nos. 2014/0127450 (application Ser. No. 14/045,758), 2015/0266778 (application Ser. No. 14/045,519), 2014/0127458 (application Ser. No. 14/045,766), 2014/0342124 (application Ser. No. 14/045,540), 2014/0272216 (application Ser. No. 14/207,413), 2014/0263683 (application Ser. No. 14/207,421), 2014/0314990 (application Ser. No. 14/207,920), 2014/0322083 (application Ser. No. 14/209,238), 2014/0363665 (application Ser. No. 14/295,601), 2014/0361471 (application Ser. No. 14/295,402), 2015/0225295 (application Ser. No. 14/602,313), 2015/0056437 (Ser. No. 14/463,901), WO 2015/051243 (PCT/US2014/059024), WO 2015/103107 (PCT/US2014/072494), WO 2016/022485 (PCT/2015/043452), WO 2016/022522 (PCT/2015/043540), WO 2016/154021 (PCT/US2016/023181), WO 2016/054602 (PCT/US2015/053879), WO 2016/154024 (PCT/US2016/023193), each of which is expressly incorporated herein by reference in its entirety for all purposes.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the following description, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

The invention claimed is:

1. A method for producing calcium and/or magnesium silicate, or calcium and/or magnesium silicate hydrate product capable of carbonation or hydration to form a cementitious product, comprising:
    (a) providing a ground mixture comprising source materials of calcium and/or magnesium oxide and silica;
    (b) providing a gas comprising a steam of water over the ground mixture of source materials at a pressure, wherein the steam of water has a partial pressure that ranges from atmospheric pressure to supercritical water pressure; and
    (c) subjecting the ground mixture of source materials to a temperature of from about 400° C. to about 1,200° C.
        (i) for a time sufficient to calcine the ground mixture, and (ii) for a time sufficient to fuse the calcined ground mixture to form the cementitious product.

2. The method of claim 1, wherein the temperature sufficient to heat the ground mixture is lower than about 800° C.

3. The method of claim 1, wherein the temperature sufficient to fuse the ground mixture is lower than about 800° C.

4. The method of claim 1, wherein the steam of water is substantially in supercritical condition.

5. The method of claim 1, further comprising cooling the cement product to ambient temperature.

6. The method of claim 1, further comprising grinding the cement agglomerate.

7. The method of claim 6, further comprising, before grinding, adding one or more set-controlling admixtures to the cementitious product.

8. The method of claim 1, wherein the source materials of metal oxide and silica are selected from magnesium silicates, magnesium oxide and silica source, calcium oxide and silica source, magnesium carbonate and silica source, calcium carbonate and silica source, low grade limestone having calcium and silicone, magnesium calcium aluminates, magnesium calcium aluminum silicates, and magnesium calcium silicates.

9. The method of claim 1, wherein the ground mixture comprises one or more of: $Ca_3SiO_5$ (C3S), $Ca_2SiO_4$ (C2S), $Ca_3Al_2O_6$ (C3A), $Ca_4Al_2Fe_2O_{10}$ (C4AF), $4CaO.3Al_2O_3.SO_3$ (C4A3S), amorphous calcium aluminum silicate, or amorphous mellilite groups.

10. The method of claim 1, wherein the ground mixture of source materials to is subjected to a temperature of from 400° C. to 1,200° C.

11. The method of claim 1, wherein the ground mixture of source materials to is subjected to a temperature of from 500° C. to 1,200° C.

12. The method of claim 1, wherein the ground mixture of source materials to is subjected to a temperature of from 600° C. to 1,200° C.

13. The method of claim 1, wherein the ground mixture of source materials to is subjected to a temperature of from 700° C. to 1,200° C.

14. The method of claim 1, wherein the ground mixture comprises one or more of: $Ca_3SiO_5$ (C3S), $Ca_2SiO_4$ (C2S), $Ca_3Al_2O_6$ (C3A), $Ca_4Al_2Fe_2O_{10}$ (C4AF), $4CaO.3Al_2O_3.SO_3$ (C4A3S), wollastonite, pseudowollastonite, rankinite, belilite, larnite, bredigite, alite and melilite.

* * * * *